Jan. 6, 1931.  J. EMERSON  1,787,619
METHOD OF MAKING GLASS BOWLS
Filed April 28, 1928
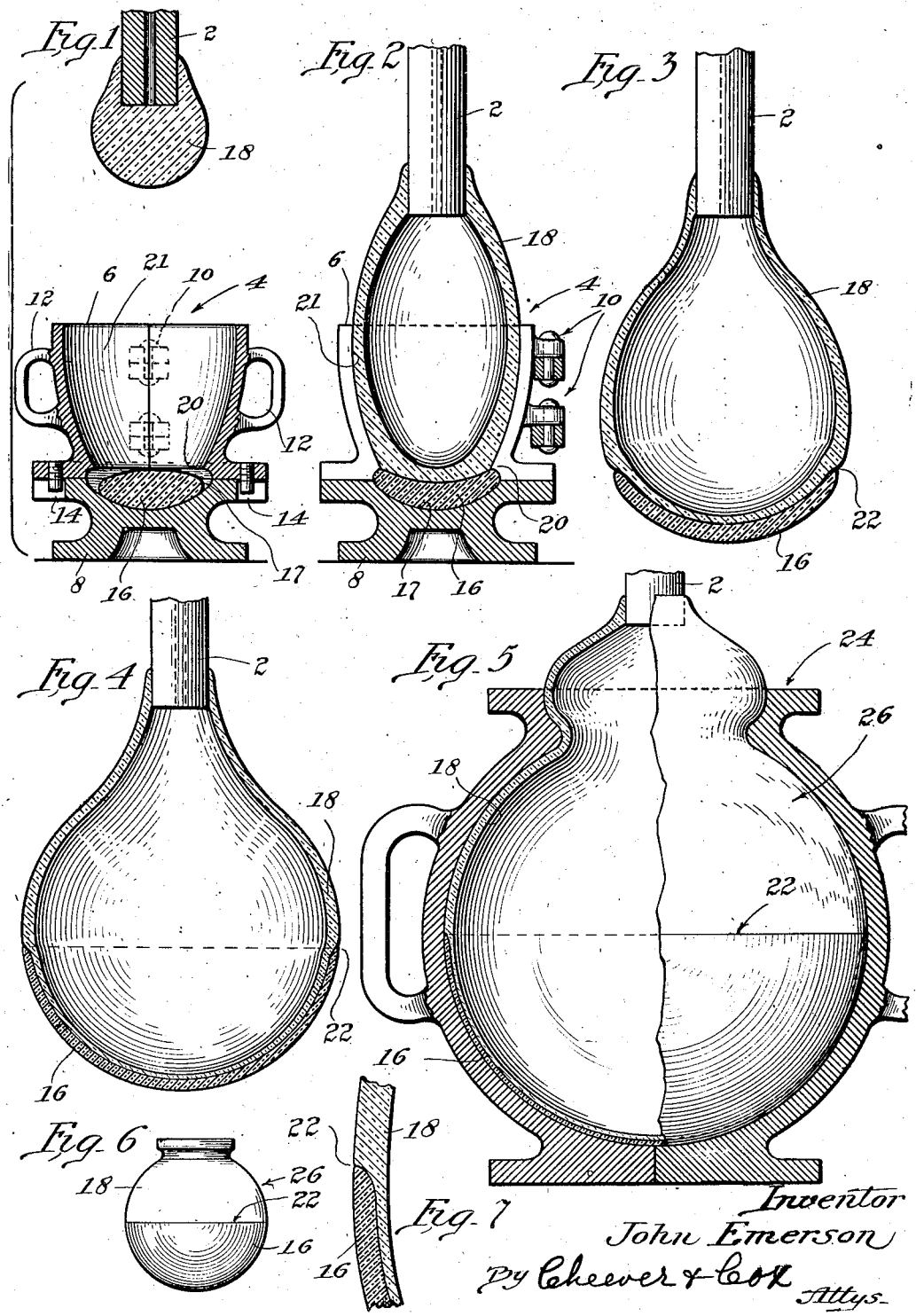
Inventor
John Emerson
By Cheever & Cox Attys.

Patented Jan. 6, 1931

1,787,619

UNITED STATES PATENT OFFICE

JOHN EMERSON, OF CHICAGO, ILLINOIS, ASSIGNOR TO INLAND GLASS WORKS, INC., OF CHICAGO, ILLINOIS, A CORPORATION OF ILLINOIS

METHOD OF MAKING GLASS BOWLS

Application filed April 28, 1928. Serial No. 273,461.

My invention relates in general to methods of making glass globes, and more particularly to methods of glass blowing and molding whereby multi-colored glass bowls or globes and articles of like nature may be expeditiously produced.

In the manufacture of articles such as glass globes and bowls for use with lighting fixtures, it is the practice in certain instances to combine glass materials of varying colors to produce multi-colored effects. Thus, for example, it is some times desirable to use globes for street lighting fixtures, exit fixtures, and the like, which have one portion or section thereof formed with red glass and the remaining section with white or crystal glass, said crystal glass serving to permit the unobstructed passage therethrough of illuminating light rays. These multi-colored globes may be produced by applying a coating of colored glass, as for example, the above mentioned red glass, to the transparent crystal glass and by employing methods heretofore practiced in the production of multi-colored articles of the instant nature, one of the difficulties which presents itself is that of forming a uniform coating of colored glass upon the white or crystal glass. Obviously if the coating is not uniform a blotchy effect is produced by the light rays. In an endeavor to overcome these conditions, it has heretofore been the practice to increase the thickness of the colored glass coating so as to make the color appear more uniform and as a result the efficiency of the glass is materially reduced.

Another difficulty which is presented in practicing methods heretofore known is that of producing multi-colored globes with the proper line of demarcation between the combined sections of glass. This line of demarcation should be very distinct and uniform in order to satisfactorily meet the conditions incident to the use of the globes.

In general, my invention contemplates the production of methods of manufacturing multi-colored glass globes and the like, whereby the above mentioned and other difficulties heretofore presented will be substantially obviated and articles may be produced which meet the requirements with respect to uniformity and economy of construction.

More specifically, it is an object of my invention to provide methods for expeditiously producing multi-colored glass globes and the like wherein a predetermined quantity of molten glass of one color may be combined in covering relation with respect to a quantity of glass of another color and this combination of materials subsequently blown and molded into an article of desired shape, the predetermined quantity of colored glass being uniformly distributed over the surface of the other glass.

Another object of my invention is to provide a method of forming glass globes and the like which consists in depositing a predetermined quantity of molten colored glass within a mold, combining a quantity of glass of another color therewith, partially shaping the combined materials, and then associating said partially formed article with a second mold wherein the materials are shaped into the desired form.

A further object of my invention is to provide an effective method of producing multi-colored glass globes and the like in which the line of demarcation between the different colored glass materials which are employed will be sharp, distinct and very uniform, this being accomplished by practicing certain molding steps in which a predetermined quantity of one of the colored glass materials is employed.

A still further object of my invention is to provide an improved method of producing multi-colored glass globes and the like in which a predetermined quantity of glass of one color is deposited within the bottom of a mold; a quantity of glass carried at the extremity of a blow-pipe is then lowered within the mold and placed upon the upper surface of the predetermined quantity of glass, the combined materials being then formed so that the line of connection between the two glass materials is distinct and uniform.

In addition to the above mentioned characteristics, my invention contemplates the provision of articles of manufacture, namely glass globes and the like which comprise a combination of glass materials of varied colors, the arrangement of said combination being such that colored glass of very high efficiency may be employed to produce a sharp line of demarcation between the different colored glass materials, a glass globe thereby being presented which is far superior from the standpoint of economy and uniform construction to globes which have heretofore been produced.

These and other objects will be more apparent from the following detailed description when considered in connection with the accompanying drawing wherein:

Figure 1 discloses a blow-pipe supplied with a quantity of molten glass positioned above a molding apparatus, shown in section, in which a predetermined quantity of molten colored glass has been placed;

Figure 2 discloses a sectional view of the mold taken at right angles of the section shown in Figure 1, the molten crystal glass being shown combined with the predetermined quantity of colored glass within the mold;

Figure 3 discloses the combined arrangement of the glass materials after said materials have been removed from the mold shown in Figure 2 and subjected to a further blowing operation;

Figure 4 is similar to Figure 3 and shows the relative positions of the glass materials as the blowing operation is continued;

Figure 5 discloses a globe completely formed within the second mold;

Figure 6 is a side elevational view of a completed globe, disclosing a sharp line of demarcation between the upper and lower sections thereof; and Figure 7 is an enlarged fragmentary detail view in section showing the relative thicknesses of the combined glass materials.

Referring now to the drawing wherein like numerals have been employed to designate similar parts throughout the various figures, it is to be understood that in practicing methods of forming glass globes and the like in accordance with the teachings of my invention a blow-pipe 2 of conventional design may be employed as clearly shown in Figures 1 to 4 inclusive. A molding device indicated generally by the numeral 4 may be employed, said molding device being similar to the apparatus disclosed in my co-pending application relating to molding apparatus, Serial No. 273,462 filed Apr. 28, 1928. This molding device 4 consists of an upper mold section 6 and a lower mold section 8, by which the upper section 6 is supported. The upper mold section 6 comprises two companion sections which are hinged at 10 and which are provided with suitable manipulating handles 12. To properly associate the section 6 with the lower or base section 8, it is only necessary to swing the companion portions of section 6 together by gripping the handles 12 and properly associate dowel or guide pins 14 carried by a flange portion of the section 6 with suitable apertures in the section 8. After these sections 6 and 8 have been properly associated, a predetermined quantity or globule of colored glass 16 is deposited within a cavity 17 of the mold section 8, as clearly shown in Figure 1. This glass material 16 being in a molten state, it will of itself be equally distributed within a predetermined central portion of the cavity 17 in the section 8.

The blow-pipe 2 is supplied with a quantity of glass such as white or crystal glass 18, from any suitable source (not shown) and after the colored glass 16 has been properly positioned within the section 8, the glass 18 carried by the blow-pipe is then lowered within the mold. When the lower surface of the glass 18 is moved into engagement with the upper surface of the globule of glass 16, sufficient air is introduced through the blow-pipe 20 to cause the glass 18 to completely occupy the mold cavity 21 within the section 6 as shown in Figure 2. At this point of the description, attention is directed to the fact that when the glass 18 is carried into association with the globule of colored glass 16, said globule will be urged outwardly or radially within the mold cavity 17 of the section 8 and the lower portion of the mold cavity 21 of the section 6, the uppermost portion of the globule terminating along a circular line which is determined by an annular edge 20 horizontally positioned within the lower portion of the mold section 6, Figure 1. By providing this terminating edge 20, I am able to produce a sharp, distinct and uniform line of demarcation between the colored glass 16 and the white or crystal glass 18 when said materials are initially combined. This point of the description is very important because it sets forth an important initial step in my improved method of producing glass globes, which to my knowledge has heretofore never been employed. From the foregoing, it will then be apparent that I employ the mold 4 as a means for initially and partially forming or shaping the combined materials and in the course of this initial step I determine the line of demarcation or division between the glass materials 16 and 18.

After the materials have been partially formed within the mold 4 in the manner described, the mold section 6 may be removed by manipulating the handles 12 thereof so as to swing the companion sections of the mold away from the partially formed globe. The introduction of additional air through the blow-pipe 2 will cause the combined materials to assume the positions disclosed in Figure 3. It will be observed that as additional air is admitted the line of demarcation between the materials which I have indicated by the numeral 22 will be moved upwardly with respect to the lower portion of the combined structure and when the blowing operation has been continued further, the materials will assume the form disclosed in Figure 4. It will, of course, be understood that gravity acts upon the molten glass materials and cooperates with the blowing operation to effect the distribution of the colored glass material 16 over the glass 18. When the materials assume the form shown in Figure 4, a second molding device indicated generally by the numeral 24, Figure 5, is employed. The contour of the cavity of this mold 24 conforms to the final form into which the glass materials are to be shaped and by the introduction of additional air through the blow-pipe 2, said materials will be formed within the mold 24 as clearly shown in Figure 5. At this stage of the operation, the line of demarcation 22 will have been moved so as to assume a position substantially intermediate the bottom and top of the completed globe which I have indicated by the numeral 26. This line of demarcation 22 is very sharp and distinct and extends uniformly in a horizontal plane around the periphery of the spherical bowl 26. After this molding operation is completed the sections comprising the mold 24 may be removed and the upper portion of the globe 26 trimmed so as to present the completed globe structure shown in Figure 6.

In Figure 7 I have disclosed an enlarged fragmentary sectional view at the line of demarcation 22, showing the relative positions and the thicknesses of the glass materials 16 and 18. It is to be noted that my improved method includes the application of a relatively thin coating of colored glass 16 which is uniformly distributed over the surface of the glass material 18. Thus, in addition to forming a sharp and uniform line of division between the colored glass sections 16 and 18, I am able to uniformly distribute the colored glass 16 and because this colored glass is uniformly distributed over the surface of the glass 18, only a relatively thin coat thereof is required. In this respect my invention represents a decided improvement over other methods which have heretofore been practiced. At this stage of the art in the manufacture of globes and the like, it has to my knowledge been impossible to produce a relatively thin uniform coating of glass of one color upon a glass of another color. In order to counteract the blotchy effects which result when light rays penetrate a non-uniform coating of colored glass, it has been the practice to increase the thickness of the colored glass coating. Obviously the efficiency of the glass coating is materially reduced as the thickness thereof is increased and also the additional glass material which is required, serves to materially increase the cost of the completed article of manufacture. My invention precludes the necessity of applying this above mentioned heavy glass coating because my improved method enables the application of a coating of glass of uniform thickness and hence avoids the presence of unsightly, blotchy appearances. I have found that by practicing methods in accordance with the teachings of my invention I have been able to employ glass coatings having an efficiency of at least 80% which is relatively high in comparison with glass globes and the like which have heretofore been produced.

From the foregoing it will be apparent that my invention contemplates the provision of glass articles of the instant nature having inherent structural characteristics which differ from and are superior to articles of manufacture which have heretofore been produced. As already suggested, one of these advantageous characteristics resides in the production of sharp, distinct and uniform lines of division or demarcation between the combined colored glass materials. I establish these sharp lines of division when the glass materials are initially combined and one of the factors which enables the formation of these distinct lines of division resides in the use of a predetermined quantity of colored material which will be forced outwardly and upwardly against the determining edge of the mold. My invention enables the expeditious production of a plurality of multi-colored globes which will all possess the above mentioned uniform characteristics. The use of a predetermined or definite quantity of colored glass in the production of each globe insures uniformity in the thickness of the colored glass coating and hence maximum efficiency thereof. Thus, my invention serves to greatly accelerate the manufacture of multicolored glass globes and enables the production of globes and the like of a very high standard from the standpoint of construction and appearance. From the foregoing it will be clear that when globes are produced in accordance with the teachings of my invention the colored glass coating which is applied to the shell or body portion of the globe may be of a considerably lighter density than coatings which have heretofore been used and this lighter glass density is occasioned as the result of the uniformity with which I am able to distribute the coating upon the under glass shell. By employing a coating of colored glass which is of a lighter density, obviously the amount of light absorption is correspondingly reduced or in other words, as hereinbefore suggested, said coating will have a very high efficiency. It will also be apparent that my improved method may be practiced with a minimum amount of skill and effort on the part of the operator. It is only necessary that the operator introduce the proper quantity of molten glass into the mold cavity and having thus properly positioned said glass, it is only necessary to then combine therewith the transparent glass, the annular ridge or edge within the mold cavity serving in this instance to determine the line of demarcation between the combined glass materials with the exercise of minimum effort and skill. Such factors as these enable glass globes and the like to be manufactured with accelerated speed and economy.

The particular type of globe which I have described very readily lends itself for use in connection with street lighting and the like, the clear or white section of the globe serving to permit the unobstructed passage therethrough of illuminating light rays and the red section at the same time serving as an indicating medium to apprize one of the presence of a fire box, road crossing and the like. I have described this particular type of globe only for the purpose of clearly illustrating an embodiment of my invention and therefore it should be understood that my invention is not limited to the production of any specific type of glass globes and bowls or to the use of any particular combination of colors but it capable of a wide range of application in instances where multi-colored glass articles of the instant nature having sharp lines of demarcation and uniformity in construction are required.

Having thus described my invention, what I claim as new and desire to secure by Letters Patent is:

1. The method of producing glass globes and the like from glass materials having varied characteristics, which consists in placing a measured quantity of molten glass of a certain characteristic within a mold, combining and partially covering within said mold a quantity of molten glass of another characteristic with said measured quantity so as to present within the mold a distinct line of division at the surface between the measured glass material and the other glass material, and then forming the combined materials into a desired shape with a predetermined displacement thereof.

2. The method of producing glass globes and the like which consists in partly coating molten glass of one color in a mold with a measured quantity of molten glass of another color in said mold, with a sharp line of demarcation along the surface between said measured and uncoated materials in said mold, and then forming the combined materials into a desired shape with a predetermined displacement thereof.

3. The method of producing glass globes and the like which consists in placing a predetermined quantity of molten glass within a mold, partially coating another quantity of glass therewith within said mold and contemporaneously determining a definite line of demarcation along the surface between the coating and uncoated materials within the mold, and blowing the combined materials into a predetermined form within a second mold.

4. The method of producing multi-colored glass globes and the like which consists in placing a predetermined quantity of molten glass of a predetermined color within a mold, maintaining the uniform distribution of said predetermined quantity within the mold, coating said predetermined quantity upon a portion of molten glass of another color within said mold, forming a sharp line of division along the surface between the different colored glass material in said mold, and then forming the combined material into a globe of desired shape.

5. The method of producing glass globes from glass materials of different colors which consists in placing a globule of molten glass of predetermined size within the central portion of a mold cavity, uniting molten glass of another color therewith in said mold so as to effect uniform displacement of the glass globule within the mold and to present a sharp, uniform line of demarcation between the glass material in said mold, and then forming the combined materials into a globe of desired shape.

6. The method of producing glass globes and the like from glass materials which differ in color, which consists in depositing a globule of molten glass of predetermined size and color within the central portion of a mold cavity, maintaining the uniform distribution of the globule within the cavity through the force of gravity, uniting a quantity of molten glass of another color with said globule in said mold so as to present a sharp uniform line of demarcation between said materials within the mold, removing the combined materials from the mold, blowing said materials into a desired shape, and then completing the forming of said materials within a mold of desired shape, thereby presenting a glass globe with the predetermined quantity of colored glass uniformly distributed upon the other glass.

7. The method of producing glass globes and the like which consists in separating a predetermined quantity of molten glass from a supply thereof, positioning said separated glass material in a receptacle, coating said separated quantity upon a portion of molten glass of another color, within said receptacle so as to form a sharp line of division along the surface between the different colored glass materials in said receptacle, and then forming the combined materials into a globe of desired shape.

8. The method of producing glass globes from glass materials of different colors which consists in placing a measured quantity of molten unmolded glass within a mold cavity, uniting molten glass of another color with said measured quantity within said mold cavity so as to effect uniform displacement of said measured quantity over a part of the other material and to present a sharp, uniform line of demaracation along the surface between said materials within said mold cavity, and then forming the materials into a globe of desired shape.

9. The method of producing glass globes from glass materials of different colors which consists in placing a quantity of molten glass within the mold cavity, uniting molten glass of another color with the molten glass within the mold cavity so as to effect lateral displacement of the first mentioned quantitv within the mold cavity and a partial covering of said second mentioned glass material and thereby present a sharp, uniform line of demarcation at the surface between the glass materials within the mold cavity, and then forming the combined materials into a globe of desired shape.

10. The method of producing glass globes from glass materials of different colors which consists in partially coating a quantity of unmolded molten glass of one color with a predetermined quantity of unmolded molten glass of another color within a mold so as to contemporaneously present a sharp, uniform line of surface demarcation between said materials in said mold, and then forming said combined materials into a globe of desired shape.

11. The method of producing multi-colored glass globes and the like which consists in placing a quantity of molten glass within a mold cavity, combining therewith in said mold cavity a quantity of molten glass of another color so as to effect a partial covering of said second mentioned quantity, contemporaneously displacing both of said combined materials in said mold so as to present a sharp line of surface demarcation between said materials in said mold, and then forming the combined materials into a globe of desired shape.

12. The method of producing glass globes of materials of different colors which consists in placing a quantity of molten glass within a mold cavity having an edge for determining the displacement of material therein, combining glass material of another color with said first mentioned material within the mold so as to cause said first mentioned material to partially cover said second mentioned material and to be displaced within the zone determined by the edge within said mold, so as to present a sharp, uniform line of surface demarcation between the glass materials in said mold, and then forming said combined materials into a globe of desired shape.

13. The method of producing multi-colored glass globes which consists in placing a batch of molten glass of one color within the lower portion of a mold cavity, lowering a batch of molten glass of another color within said mold cavity into contact with said first mentioned batch so as to partially coat said second mentioned material, forming a sharp line of surface demarcation between said combined batches of molten glass, and blowing said combined glass materials into a globe of desired shape so as to uniformly displace the combined glass materials.

14. The method of producing multi-colored glass globes and the like which consists in placing a batch of molten glass of one color at the extremity of a blow pipe, lowering said batch of molten glass into association with a batch of molten glass of another color within a mold so as to partially coat the first mentioned material and present a sharp line of surface demarcation between said glass matrials and then blowing the combined batches of glass materials so as to form a globe of desired shape.

15. The method of producing multi-colored glass globes which consists in depositing a batch of molten glass material of a given color within a mold, placing a batch of molten glass of another color at the extremity of a blow pipe, lowering the batch on the blow pipe within the mold into association with the deposited batch so as to laterally displace said deposited batch and thus form a sharp line of surface demarcation between said glass materials within the mold, and then forming said combined materials into a globe of desired shape.

16. The method of producing multi-colored glass globes, which consists in placing a batch of molten glass material of a given color within a mold, placing a batch of molten glass of another color at the extremity of a blow pipe, lowering the batch of material on the blow pipe within the mold into association with the deposited batch, blowing the combined materials so as to present a sharp line of surface demarcation between said materials within the mold, and then blowing said combined materials into a globe of desired shape.

17. The method of producing multi-colored glass globes, which consists in placing a batch of molten glass material of a given color within a mold, placing a batch of molten glass of another color at the extremity of a blow pipe, lowering the batch of material on the blow pipe within the mold into association with the deposited batch, blowing the combined materials so as to present a sharp line of surface demarcation between said materials within the mold, removing the combined glass materials from the first mold, and then blowing said combined materials within a second mold to present a globe of desired shape.

In witness whereof, I have hereunto subscribed my name.

JOHN EMERSON.